United States Patent [19]
Kishner

[11] Patent Number: 6,011,876
[45] Date of Patent: *Jan. 4, 2000

[54] SYSTEM AND METHOD FOR CONVERTING AN INCOMING IMAGE INTO ELECTRONIC FORM

[75] Inventor: Stanley J. Kishner, Pomona, N.Y.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,782

[22] Filed: Feb. 26, 1997

[51] Int. Cl.$^7$ ........................................................ G06K 9/36
[52] U.S. Cl. .......................... 382/284; 348/332; 348/246; 250/208.1; 359/629
[58] Field of Search .............................. 250/208.1, 201.9, 250/332, 334, 349, 353; 434/44; 382/284; 348/332, 218, 246, 335, 337; 359/636, 629–634

[56] References Cited

U.S. PATENT DOCUMENTS

| | | | |
|---|---|---|---|
| 3,574,262 | 4/1971 | Bowker | 434/44 |
| 3,915,548 | 10/1975 | Opittek et al. | 345/7 |
| 4,237,492 | 12/1980 | Roth et al. | 348/128 |
| 4,823,188 | 4/1989 | Fauquet et al. | 348/263 |
| 5,093,563 | 3/1992 | Small et al. | 250/332 |
| 5,155,623 | 10/1992 | Miller et al. | 359/495 |
| 5,194,959 | 3/1993 | Kaneko et al. | 348/335 |
| 5,686,960 | 11/1997 | Sussman et al. | 348/128 |
| 5,737,072 | 4/1998 | Emery et al. | 356/73 |
| 5,774,269 | 6/1998 | Snoeren | 359/636 |
| 5,847,879 | 12/1998 | Cook | 359/631 |

*Primary Examiner*—Leo H. Boudreau
*Assistant Examiner*—Ishrat Sherali
*Attorney, Agent, or Firm*—William C. Schubert; Glenn H. Lenzen, Jr.

[57] ABSTRACT

A system (50) and method for converting an incoming image of a scene (12) into electronic form adapted for use with focal plane arrays of detectors (24, 28). The inventive system (50) includes a surface (30) having an electromagnetic energy transmissive region (34), a reflective region (32), and a transition region (36) that has varying reflectance. A first focal plane array (24) detects a first portion (18, 39, 43) of the incoming image (12) that is transmitted through the transmissive region and the transition region (36). A second focal plane array (28) detects a second portion of the incoming image (20, 41, 45) reflected by the reflective region (32) and the transition region (36). An image combining system (40) combines the first (43) and second portions (45) of the incoming image via an image combining algorithm and provides a combined image without a dead pixel region. In the illustrative embodiment, the incoming image (12) is focused onto the surface (30) via a first lens (22). The surface (30) is a glass surface having a coating with varying degrees of reflectance across the surface (30). In the transition region (36) the glass surface (30) changes from completely transmissive to completely reflective. The gradient of reflectance in the transition region (36) is pre-determined and varies in accordance with information in the image combining algorithm. In the specific embodiment, a second lens (26) focuses the first portion (43) of the incoming image (12) onto the first focal plane array (24). A third lens (26) focuses the second portion (45) of the incoming image (12) onto the second focal plane array. Electromagnetic energy detected by the first (24) and the second (28) focal plane arrays is converted into electronic signals that are fed to a computer (40) running software that includes the image combining algorithm. The image combining algorithm includes a correlation algorithm for maximizing image registration. The image combining system also includes a display monitor (46) for displaying a combined image.

20 Claims, 2 Drawing Sheets

SYSTEM AND METHOD FOR CONVERTING AN INCOMING IMAGE INTO ELECTRONIC FORM

BACKGROUND OF THE INVENTION

1. Field of Invention

This invention relates to imaging devices. Specifically, the present invention relates to systems and methods for optically butting focal plane arrays.

2. Description of the Related Art

Imaging systems are used in a variety of demanding applications ranging from infrared missile tracking systems to commercial video cameras to airborne and space-based remote sensing systems. Such imaging systems often require very reliable and precise components such as focal plane arrays to handle very large images.

Focal plane arrays of energy detectors are used to convert incoming images into electronic form for further image processing, enhancement, information extraction, or display. Typically a focal plane array detects an image in the form of incoming electromagnetic energy such as light or infrared energy and converts the image into electronic signals for further signal processing.

Reliable precise, and cost effective focal plane arrays that can handle very large images are difficult to obtain. Large, high quality semiconductor wafers required for large focal plane arrays are often rare and expensive. Typically several focal plane arrays must be manufactured before obtaining an array of sufficient quality for use in present imaging systems. Such large focal plane arrays are very expensive and often impractical.

To avoid the problems and low yields inherent in large focal plane arrays, a method for optically butting two smaller arrays was developed. Small, high-quality focal plane arrays are less expensive and easier to manufacture than one large array of equivalent surface area. The method utilizes a prism that splits an incoming image into two smaller images. Each smaller image is sent to a different focal plane array. The two smaller images are then combined electronically. However, unavoidable manufacturing imperfections at the apex of the prism typically result in a "dead pixel" region at the boundary between the two focal plane array images in which no image information is obtained. As the display resolution of imaging systems increases, the presence of a dead pixel region corresponding to a region containing no image information in the center of a reconstructed image becomes more problematic. Physically butting focal plane arrays results in similar imperfections.

Hence, a need exists in the art for a system for butting focal plane arrays of detectors that eliminates the dead pixel region between focal plane array images.

SUMMARY OF THE INVENTION

The need in the art is addressed by the system and method for converting an incoming image into electronic form of the present invention. In the illustrative embodiment the inventive system is adapted for use with focal plane arrays of detectors and includes a surface having an electromagnetic energy transmissive region, a reflective region, and a transition region having varying reflectance. A first focal plane array detects a first portion of the incoming image that is transmitted through the transmissive region and the transition region. A second focal plane array detects a second portion of the incoming image reflected by the reflective region and the transition region. An image combining system combines the first and second portions of the incoming image via an image combining algorithm and provides a combined image without a dead pixel region.

In the illustrative embodiment, the incoming image is focused onto the surface via a first lens. The surface is a glass surface having a coating with varying degrees of reflectance across the surface. In the transition region the glass surface changes from transmissive to reflective. The gradient of reflectance in the transition region is predetermined and varies in accordance with the image combining algorithm.

In the specific embodiment, a second lens focuses the first portion of the incoming image onto the first focal plane array. A third lens focuses the second portion of the incoming image onto the second focal plane array. Electromagnetic energy detected by the first and the second focal plane array is converted into electronic signals that are fed to a computer running software that includes the image combining algorithm. The image combining algorithm includes a correlation algorithm for maximizing image registration. The image combining system also includes a display monitor for displaying the combined images.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of the operation of a traditional system for optically butting focal plane arrays is intended to facilitate and understanding of the present invention.

Figure 1:
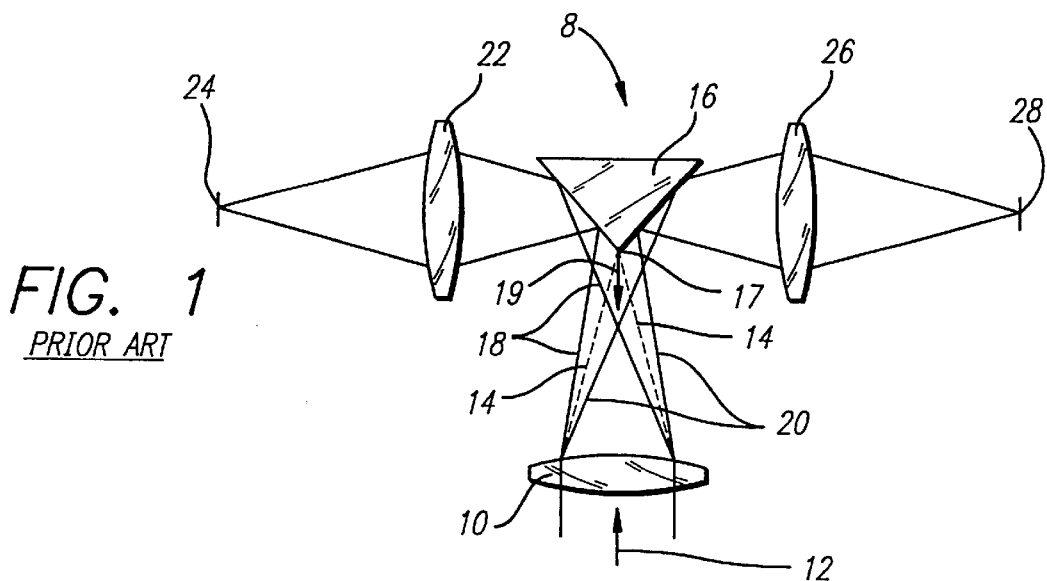
FIG. 1 is a diagram of a conventional system for optically butting two focal plane arrays.

FIG. 1 is a diagram of a conventional system 8 for optically butting a first focal plane array 24 and a second focal plane array 28. The system 8 includes a first lens 10, a prism 16, a second lens 22, a first focal plane array 24, a third lens 26, and a second focal plane array 28.

The lens 10 focuses an image of a scene 12 onto a prism 16. Left rays 18 representing light from the right portion of the image 12 reflect off the prism 16 and are re-imaged by the second lens 22 onto the first focal plane array 24. Likewise, right rays 20 representing light from the left portion of the image 12 reflect off the prism 16 and are re-imaged by the third lens 26 onto the second focal plane array 28.

Middle rays 14 represent light corresponding to the center of the image 12. The rays 14 impinge on an apex 17 of the prism 16. Due to manufacturing imperfections in the apex 17, some light 19 is scattered and is not transferred to the first or second focal plane arrays 24, 28. As a result, the combined image from the focal plane arrays 24, 28 includes dead pixel region in the center of the combined image corresponding to information loss. The images detected by the focal plane arrays 24, 28 are combined using a computer (see FIG. 3).

Figure 2A:
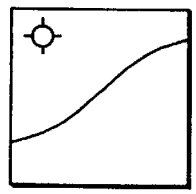
FIG. 2a is an exemplary input image.

FIG. 2a is an exemplary input image.

Figure 2B:
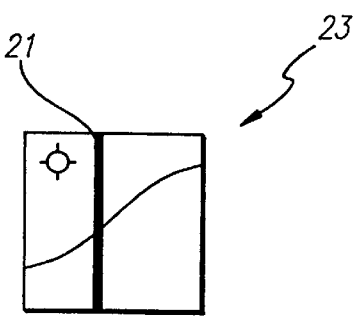
FIG. 2b is an exemplary image output by the conventional system of FIG. 1 having a dead pixel region resulting from combining two focal plane array images.

FIG. 2b is an exemplary image 23 output by the conventional system of FIG. 1 having a dead pixel region 21 resulting from combining two focal plane array images. The lack of pixel information corresponding to the region 21 becomes more problematic as the technology of imaging systems increases.

Figure 3:
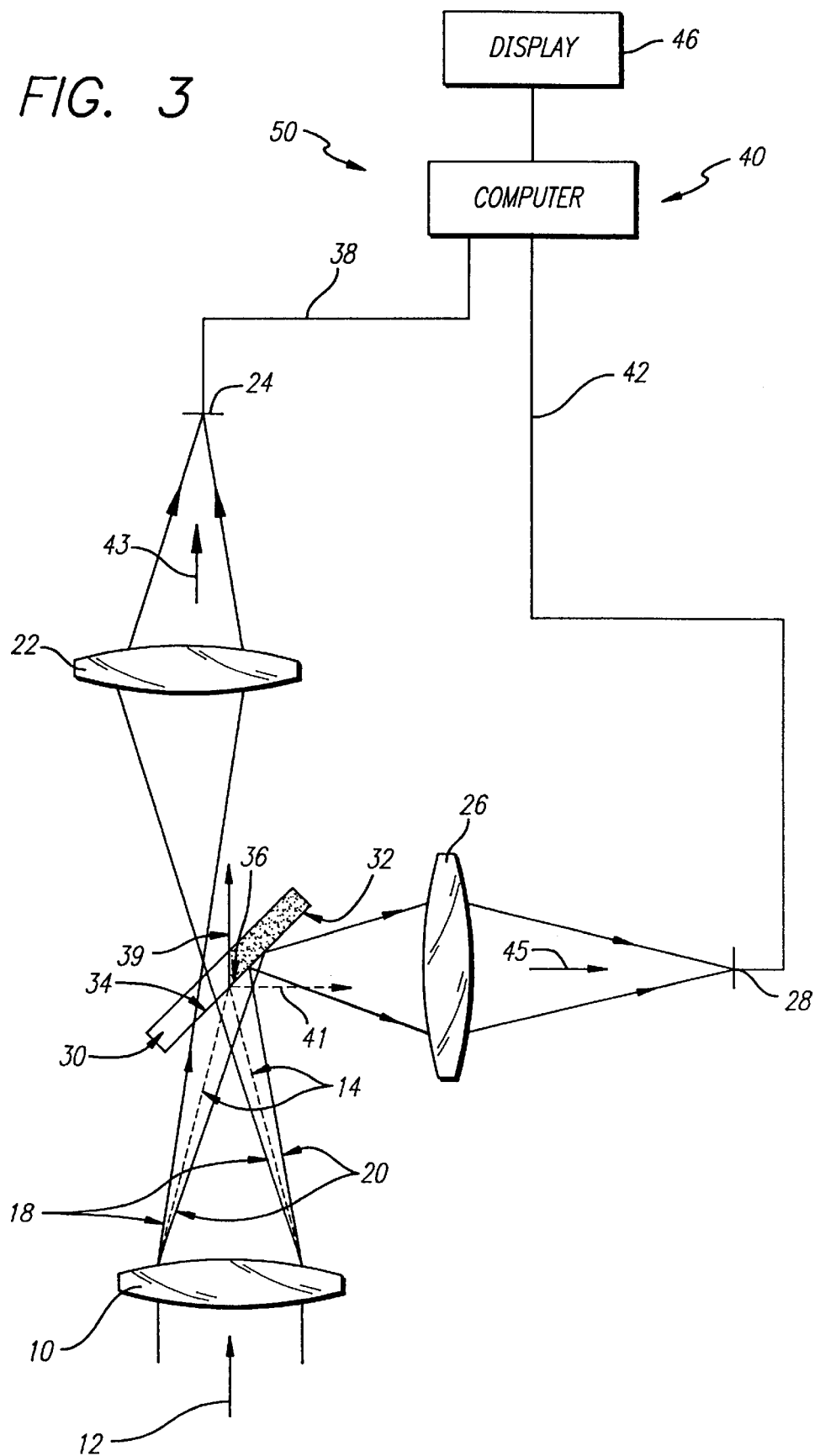
FIG. 3 is of a system for optically butting two focal plane arrays constructed in accordance with the teachings of the present invention.

FIG. 3 is a diagram of a system 50 for optically butting two focal plane arrays 24, 28 constructed in accordance with the teachings of the present invention. The system 50 includes an image separating surface 30 having a transparent region 34, a reflective region 32, and a transition region 36 which is partially reflective and partially transmissive in a complementary manner, i.e., all of the input image impinging on the transition region 36 is either transmitted or reflected. The image separating surface 30 is similar to a conventional beamsplitter except that its reflectance varies spatially across its surface. In the present specific embodiment, the transition region 36 corresponds to a band across the center of the surface 30. In the present specific embodiment, the surface 30 is glass and has an optical coating with a varying degree of reflectance. The optical coating is a thin optical grade metallic layer having a pre-determined, spatially varying thickness and a corresponding spatially varying reflectance. The metallic layer may be deposited on the surface 30 using conventional deposition methods. Those skilled in the art will appreciate that a grating that partially reflects and transmits light, or a conventional beamsplitter may be used for the transition region 36 without departing from the scope of the present invention. In the reflective region 32, the coating is designed to reflect the rays 20. In the reflective region 32, the coating may be replaced by a reflective grating without departing from the scope of the present invention.

The image of a scene 12 is focused by the lens 10 onto the surface 30 whose transition region 36 is a focal length away from the lens 10. The left rays 18 pass through the transparent region 34 and are re-imaged by the first lens 22 onto the first focal plane array 24. The right rays 20 reflect off the reflective region 32 and through the lens 26 that re-images the left portion of the image 12 onto the second focal plane array 28.

The middle rays 14 impinge on the transition region 36. Some rays 39 (shown in phantom) from the rays 14 pass through the transition region, and are re-imaged by the first lens 22 onto the first focal plane array 24. Other rays 41 from the middle rays 14 reflect to the second lens 26 and are re-imaged by the lens 26 onto the second focal plane array 28. The rays 39 and rays 41 represent light corresponding to a band through the center of the image 12.

The focal plane array 24 detects an image 43 that contains some light 18 from the transparent region 34, and some light 39 from the transition region 36. Likewise the focal plane array 28 detects an image 45 that contains some light 20 from the reflective region 32, and some light 41 from the transition region 36. When images 43 and 45 are combined, an overlap region will exist corresponding to light from the transition region 36. This overlap region will lack the typical dead pixel region.

The image 43 is transferred electronically via a bus 38 to a computer 40 running image combining software. The image 45 is transferred to the computer 40 via the bus 42. The images 43, and 45 are combined via the combining software running on the computer 40. When the two focal plane arrays 24, 28 cannot be maintained in perfect optical alignment, the combining software overlaps portions of the two images 43, 45 corresponding to the transition region 36 to find when the resulting correlation between the portions of the images 43, 45 reaches a maximum. When the correlation is a maximum the images 43, 45 are correctly aligned and registered and are combined resulting in a combined image without a typical dead pixel region as verified by a display 46. If however, the focal plane arrays 24, 28 are maintained in proper alignment, then the combining software does not need to register the images. In either case, combining is performed by dividing the image on the focal plane array 24 by the transmittance of the transparent region 34, dividing the image on the focal plane array 28 by the reflectance of the reflective region 32, and then adding the images together with the data arrays registered in the same manner as the focal plane arrays.

Those skilled in the art will appreciate that the transition region 36 may have an arbitrarily small width as long as portions of the images 43, 45 corresponding to the transition region 36 can be correlated and registered. For this purpose, the width of the transition region should be at least two pixels wide, and typically more than ten pixels wide. In the case in which the two focal planes 24, 28 are maintained in proper alignment, the transition region 36 can be smaller than two pixels wide. However, to alleviate light scattering and diffraction effects, it is recommended that the transition region 36 be more than two pixels wide.

Those skilled in the art will also appreciate that the lenses 22, 26 may be implemented as relay optical systems, comprising lenses, mirrors, or combinations of lenses and mirrors. In addition, the computer 40 may be replaced by a signal processing module that performs an image combining algorithm.

Figure 4:
FIG. 4 is the an exemplary image output by the system of the present invention.

FIG. 4 is the an exemplary image output by the system (see FIG. 3) of the present invention. Pixel information corresponding to the dead pixel region (see FIG. 2b) is preserved.

Figure 5:
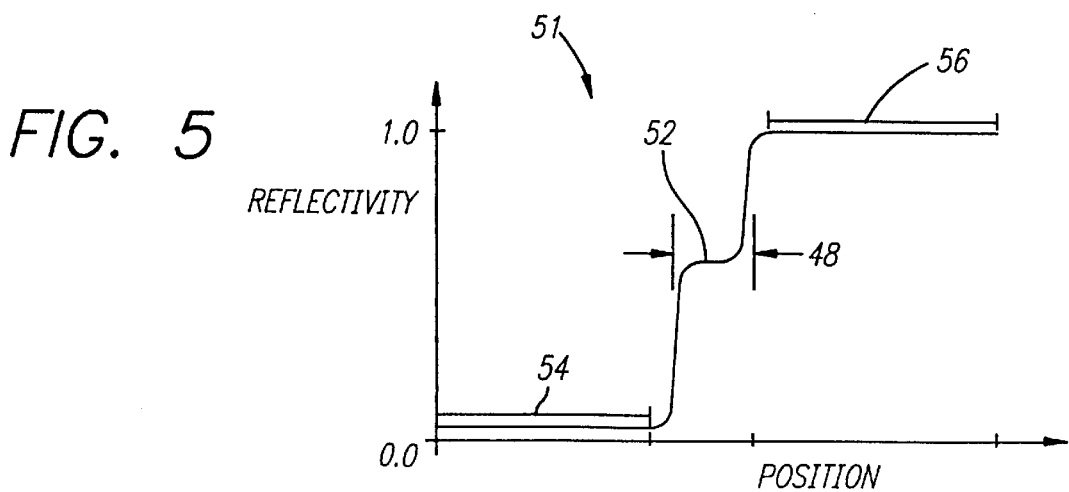
FIG. 5 is a graph of the reflectance of an image separating surface of the system of FIG. 3 versus position across the surface.

FIG. 5 is a graph 51 of the reflectance of the image separating surface 30 of the system of FIG. 3 versus position across the surface 30. A first portion 54 of the graph 51 has a reflectance of near zero. The portion 54 corresponds to the transparent region 34 of FIG. 3. A transition portion 48 of the graph 51 has a gradient of reflectance and corresponds to the transition region 36 of FIG. 3. A third portion 56 of the graph is reflective, and corresponds to the reflective region 32 of FIG. 3.

In the transition portion 48, the graph 51 has a special curve 52 for optimizing image registration when using an image correlation algorithm. Information about the curve 52 is used in an image combining algorithm (not shown) running on a computer (see FIG. 3) to facilitate image combination. Those skilled in the art will appreciate that the curve 52 may be a variety of shapes that connect the transmissive and reflective regions without departing from the scope of the present invention. It should also be clear to those having ordinary skill in the art that the present invention will also work if the image combining surface 30 is a conventional beamsplitter in which the portions 52, 54 and 56 have the same (typically 50%) reflectance. However, the curve 52 optimizes the optical efficiency of the system of the present invention by maximizing reflectance where light is reflected, and minimizing reflectance where light is transmitted. It should also be clear that a method for eliminating a dead pixel region between a first and second focal plane array image according to the teachings of the present invention includes the steps of:

1. Obtaining a surface having an electromagnetic energy transmissive region, a reflective region, and a transition region.

2. Detecting a first portion of an incoming image transmitted through the transmissive region and the transition region.

3. Detecting a second portion of the incoming image reflected by the reflective region and the transition region.

4. Combining the first and second portions of the incoming image.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for converting an incoming image into electronic form comprising:

an image separating surface having an electromagnetic energy transmissive region, a reflective region, and a transition region that has varying reflectance;

means for detecting a first portion of said incoming image transmitted through said transmissive region and said transition region and for detecting a second portion of said incoming image reflected by said reflective region and said transition region; and means for electronically combining said first and second portions of said incoming image, thereby eliminating a dead pixel region related to said transition region.

2. The invention of claim 1 wherein said transition region is between said reflective region and said transmissive region, and has spatially varying reflectance.

3. The invention of claim 1 wherein said means for detecting includes a first focal plane array for detecting said first portion of said image and a second focal plane array for detecting said second portion of said image.

4. The invention of claim 3 wherein said first portion of said image is focused onto said first focal plane array via a second lens.

5. The invention of claim 3 wherein said first portion of said image is focused onto said first focal plane array via a first relay optical system.

6. The invention of claim 3 wherein said second portion of said image is focused onto said second focal plane array via a third lens.

7. The invention of claim 3 wherein said second portion of said image is focused onto said second focal plane array via a second relay optical system.

8. The invention of claim 1 wherein said surface is a sheet of transparent material including a means for varying the degree of reflectance of said transparent material.

9. The invention of claim 8 wherein said means for varying includes a coating having varying degrees of reflectance.

10. The invention of claim 8 wherein said means for varying includes a grating that partially reflects and partially transmits electromagnetic energy.

11. The invention of claim 1 wherein at said transition region, said surface changes abruptly from reflective to transmissive.

12. The invention of claim 1 wherein the gradient of reflectance across said surface varies in accordance with the image combining algorithm.

13. The invention of claim 1 wherein said means for combining includes a computer.

14. The invention of claim 13 wherein said computer includes software for running a correlation algorithm for maximizing image registration.

15. The invention of claim 1 wherein said means for combining includes an image combining algorithm running on a processing module.

16. The invention of claim 1 wherein said means for combining includes a display monitor.

17. The invention of claim 1 wherein said incoming image is focused onto said surface via a first lens.

18. The invention of claim 1 wherein said transmissive region, transition region, and reflective region have approximately the same reflectivities.

19. A method for eliminating a dead pixel region between a first and second focal plane array image comprising the steps of:

obtaining a surface having an electromagnetic energy transmissive region, a reflective region, and a transition region that has varying degrees of reflectance;

detecting a first portion of said incoming image transmitted through said transmissive region and said transition region;

detecting a second portion of said incoming image reflected by said reflective region and said transition region; and electronically combining said first and second portions of said incoming image, thereby eliminating said dead pixel region between said first and second focal plane array image.

20. A system for reducing information loss when imaging electromagnetic energy comprising:

means for transmitting a first portion of said electromagnetic energy onto a first path;

means for reflecting a second portion of said electromagnetic energy onto a second path;

transition means therebetween for selectively reflecting and transmitting said electromagnetic energy onto said first path and said second path; and means for electronically combing electromagnetic energy from said first path and said second path, thereby reducing information loss corresponding to said transition region.

* * * * *